(12) United States Patent
Morrison et al.

(10) Patent No.: US 7,931,425 B2
(45) Date of Patent: Apr. 26, 2011

(54) CUTTING TOOL HAVING COOLANT DELIVERY SYSTEM FOR PROVIDING CUTTING FLUID IN A FAN-LIKE PATTERN

(75) Inventors: Michael Glenn Morrison, Tarrs, PA (US); Srikanth Bontha, Visakhapatnam, IN (US)

(73) Assignee: Kennametal Inc., Latrobe, PA (US)

( * ) Notice: Subject to any disclaimer, the term of this patent is extended or adjusted under 35 U.S.C. 154(b) by 225 days.

(21) Appl. No.: 12/406,149

(22) Filed: Mar. 18, 2009

(65) Prior Publication Data

US 2010/0239377 A1      Sep. 23, 2010

(51) Int. Cl.
*B23B 27/10* (2006.01)
*B23C 5/28* (2006.01)

(52) U.S. Cl. ............................................. 407/11; 82/50

(58) Field of Classification Search .................... 407/11, 407/40, 42; 408/56; 279/20; 82/50
See application file for complete search history.

(56) References Cited

U.S. PATENT DOCUMENTS

| | | | | |
|---|---|---|---|---|
| 4,302,135 A | * | 11/1981 | Lillie | 408/59 |
| 4,795,292 A | * | 1/1989 | Dye | 409/136 |
| 4,848,198 A | * | 7/1989 | Royal et al. | 82/1.11 |
| 4,883,391 A | | 11/1989 | Tsujimura et al. | |
| 5,221,162 A | | 6/1993 | Okawa | |
| 5,340,242 A | * | 8/1994 | Armbrust et al. | 407/11 |
| 5,718,156 A | * | 2/1998 | Lagrolet et al. | 82/1.11 |
| 5,772,365 A | | 6/1998 | Vogel et al. | |
| 6,149,355 A | * | 11/2000 | Fouquer et al. | 407/113 |
| 7,273,331 B2 | * | 9/2007 | Giannetti | 407/11 |

FOREIGN PATENT DOCUMENTS

| | | |
|---|---|---|
| EP | 0599393 A1 | 6/1994 |
| JP | 53-049390 A | 5/1978 |
| JP | 54-093284 A | 7/1979 |
| JP | 2003-275920 A | 9/2003 |

OTHER PUBLICATIONS

PCT/US2010/026484—International Search Report and Written Opinion dated Oct. 26, 2010.

* cited by examiner

*Primary Examiner* — Will Fridie, Jr.
(74) *Attorney, Agent, or Firm* — Matthew W. Gordon

(57) ABSTRACT

A cutting tool includes a body having a forward end and a rearward end. The forward end includes an insert-receiving pocket. The body further includes a coolant delivery system comprising a main coolant passage having a main coolant inlet extending from the rearward end toward the forward end, a primary coolant passage in fluid communication with the main coolant passage and having a primary coolant outlet exiting from the insert-receiving pocket, and a secondary coolant passage in fluid communication with the primary coolant passage and having a secondary coolant outlet exiting into the insert-receiving pocket. The primary coolant outlet intersects the secondary coolant outlet to form an outlet having a substantially non-circular shape. As a result, the coolant fluid exiting the outlet is in a fan-like pattern and is evenly distributed over the cutting edge of the insert.

17 Claims, 5 Drawing Sheets

CUTTING TOOL HAVING COOLANT DELIVERY SYSTEM FOR PROVIDING CUTTING FLUID IN A FAN-LIKE PATTERN

BACKGROUND OF THE INVENTION

The inventions relates in general to a cutting tool with a coolant delivery system, and in particular, to a cutting tool with a coolant delivery system having primary and second feeder holes resulting in a triangular geometry that causes the cutting fluid to exit the cutter body in a fan-like pattern.

Typically, cutting tools deliver coolant through either a single hole or a nozzle located in the chip gash of the cutting tool. With both of these supply methods, the cutting fluid is directed at a specific point on the cutting insert. Even though the fluid stream will widen slightly as it flows out of the cutter body, the entire cutting edge of the insert may not come into contact with the cutting fluid. While in a cut, this can cause thermal damage to the cutting insert, resulting in the reduced insert life or catastrophic failure of the cutting insert. Therefore, it would be desirable to supply cutting fluid to the entire cutting edge of the cutting insert using standard machining practices and without additional components to the cutter body.

BRIEF SUMMARY OF THE INVENTION

Briefly, according to another aspect of the invention, there is provided a cutting tool including a body having a forward end and a rearward end. The forward end includes an insert-receiving pocket. The body further includes a coolant delivery system comprising a main coolant passage having a main coolant inlet extending into the rearward end toward the forward end, a primary coolant passage in fluid communication with the main coolant passage and having a primary coolant outlet exiting into the insert-receiving pocket, and a secondary coolant passage in fluid communication with the primary coolant passage and having a secondary coolant outlet exiting into the insert-receiving pocket.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
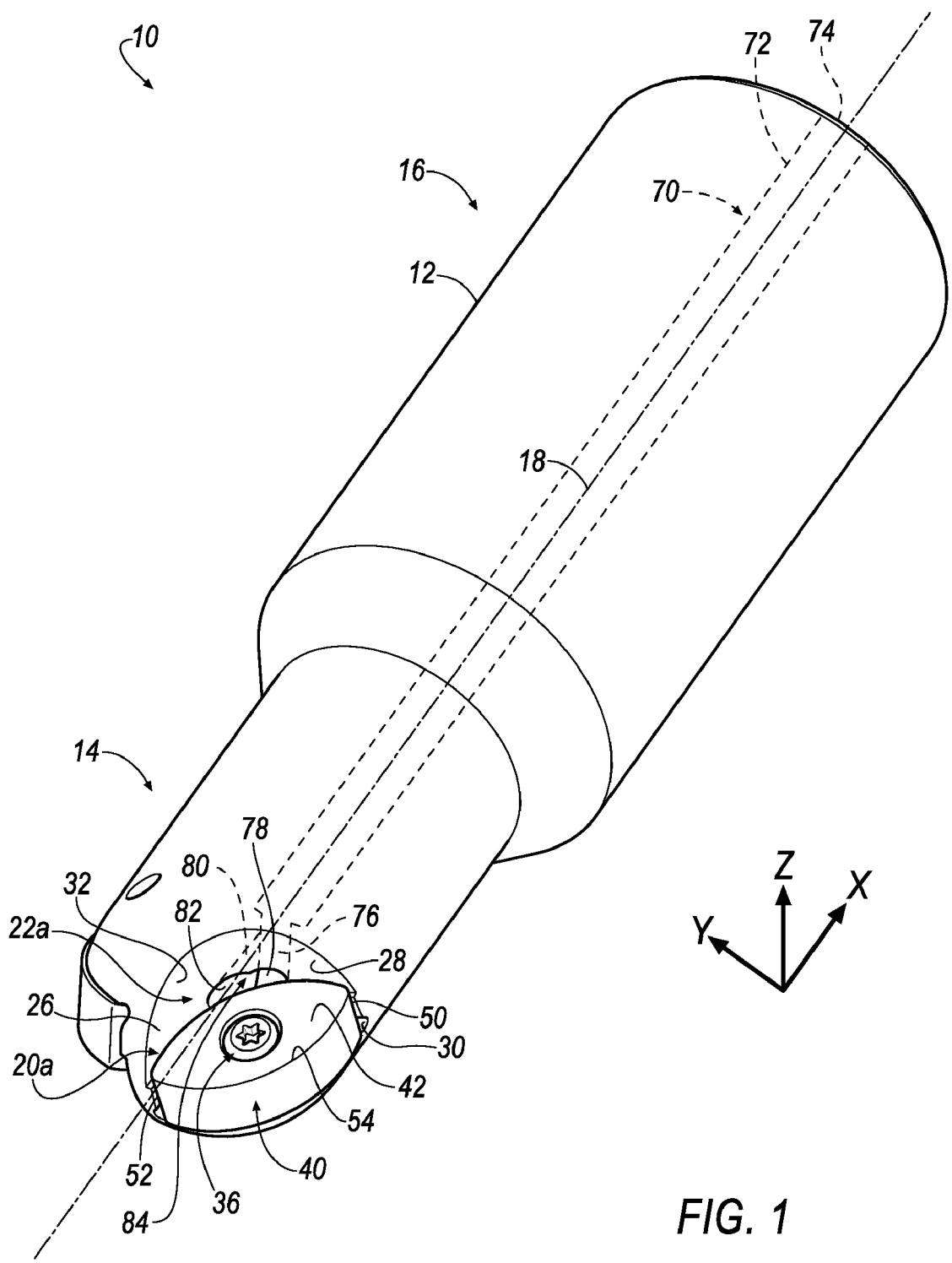
FIG. 1 is a perspective view of a cutting tool, such as a ball nose end mill with a coolant delivery system according to an embodiment of the invention.
Figure 2:
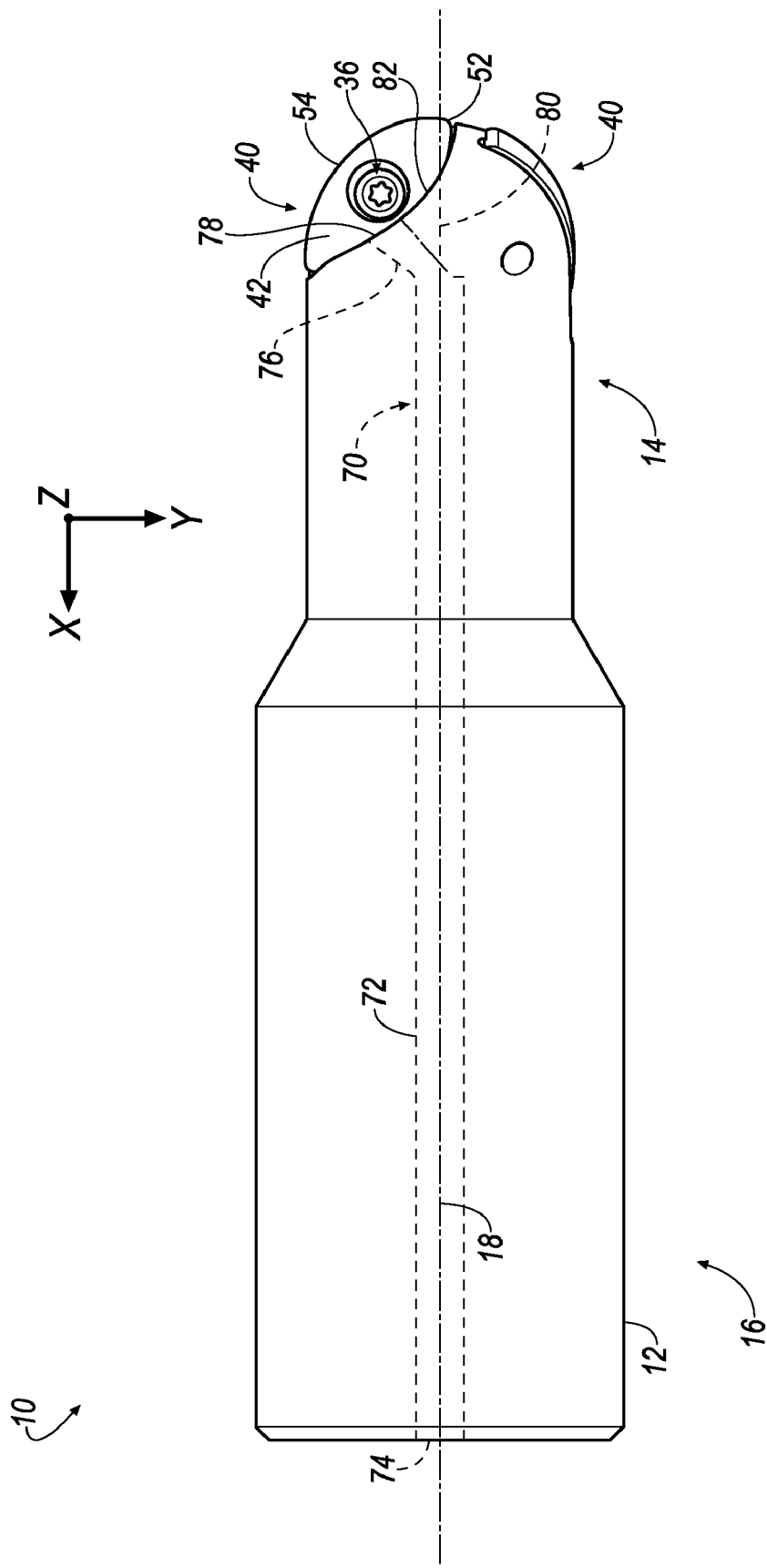
FIG. 2 is a top view of a body of the ball nose end mill of FIG. 1.

Referring now to FIGS. 1-4, a cutting tool is shown generally at 10 according to an embodiment of the invention. For illustration purposes only, the cutting tool 10 comprises a ball end mill. However, the invention is not limited by the type of cutting tool. The ball end mill 10 includes a generally cylindrical body 12 having a generally hemispherical forward end 14 and a rearward end 16 that is adapted to be fixedly secured to a machine spindle (not shown) so that the body 12 can be rotated about a longitudinal axis 18 therethrough.

The generally hemispherical forward end 14 may be intersectioned by two recesses, each one comprising an insert-receiving pocket 20a, 20b and a chip pocket 22a, 22b. In the illustrated embodiment, the insert-receiving pockets 20a, 20b and the chip pockets 22a, 22b are substantially identical in construction. Thus, only the insert-receiving pocket 20a and the chip pocket 22a will be described herein. The insert-receiving pocket 20a includes a bottom support surface 24, an axial side support surface 26 and a radial side support surface 28. A corner relief 30 is formed between the bottom support surface 24 and the axial and radial support surfaces 26, 28. A free surface 32 is provided between the axial and radial support surfaces 26, 28.

It will be appreciated that the invention is not limited by the number of insert-receiving pockets 20a, and that the invention can be practiced with any desirable number of insert-receiving pockets 20a. For example, the invention can be practiced with a ball end mill having only one insert-receiving pocket 20a, or a ball end mill having more than two insert-receiving pockets 20a.

Figure 3:
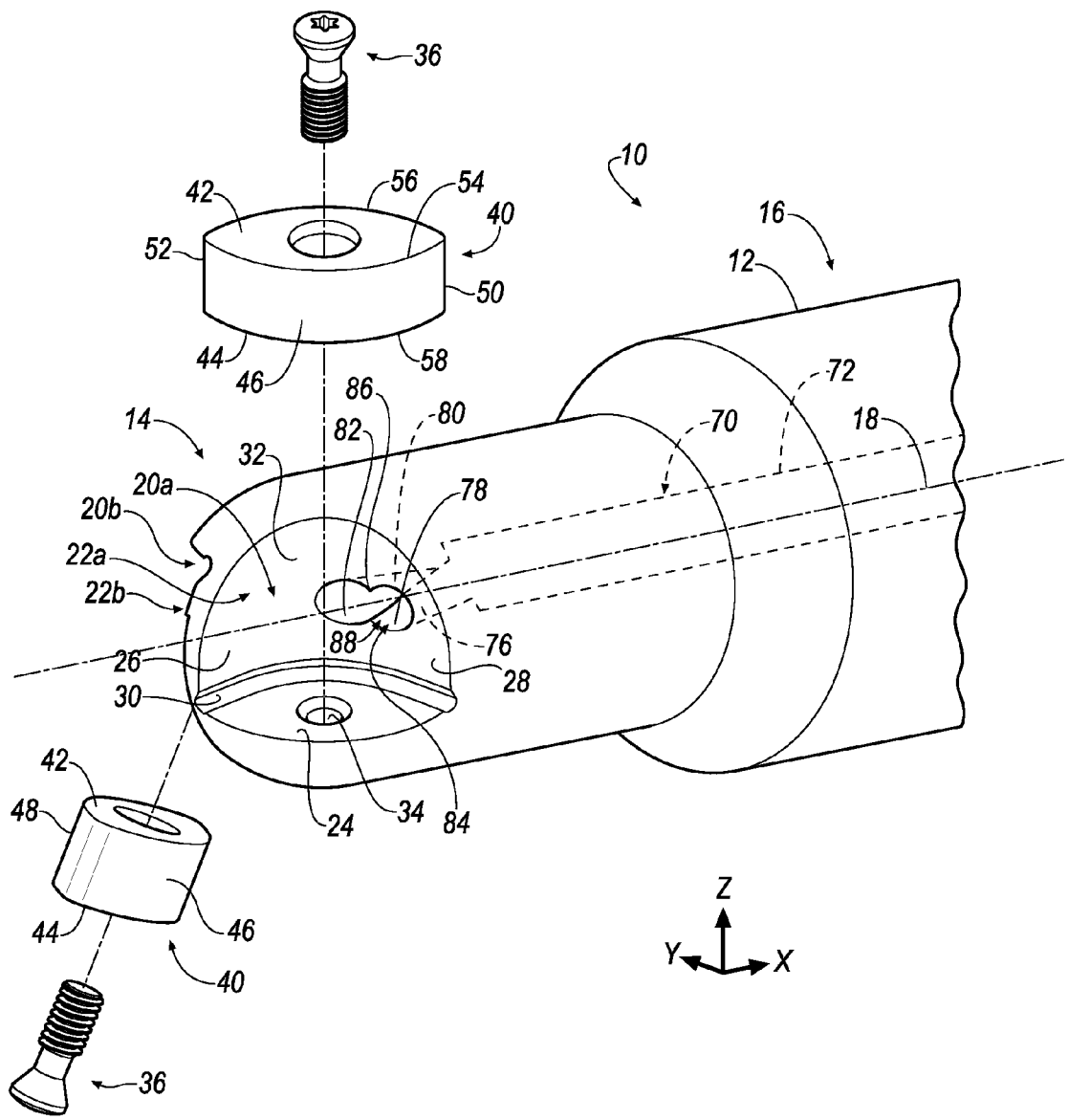
FIG. 3 is an exploded partial cutaway perspective view of a ball end mill of FIG. 1.

A threaded hole 34 is provided in the center area of bottom support surface 24 for accommodating a threaded screw 36, which provides a means for clamping a cutting insert, shown generally at 40, into the insert-receiving pocket 20a, 20b. The threaded hole 34 may be through holes or blind holes. In FIG. 3, the threaded hole 34 is shown as a through hole. It will be appreciated that the invention is not limited by the means for clamping the cutting insert 40 to the pocket 20a, and that the invention can be practiced using any means well-known to those skilled in the art for mounting the cutting insert 40 to the pocket 20a.

Figure 5:
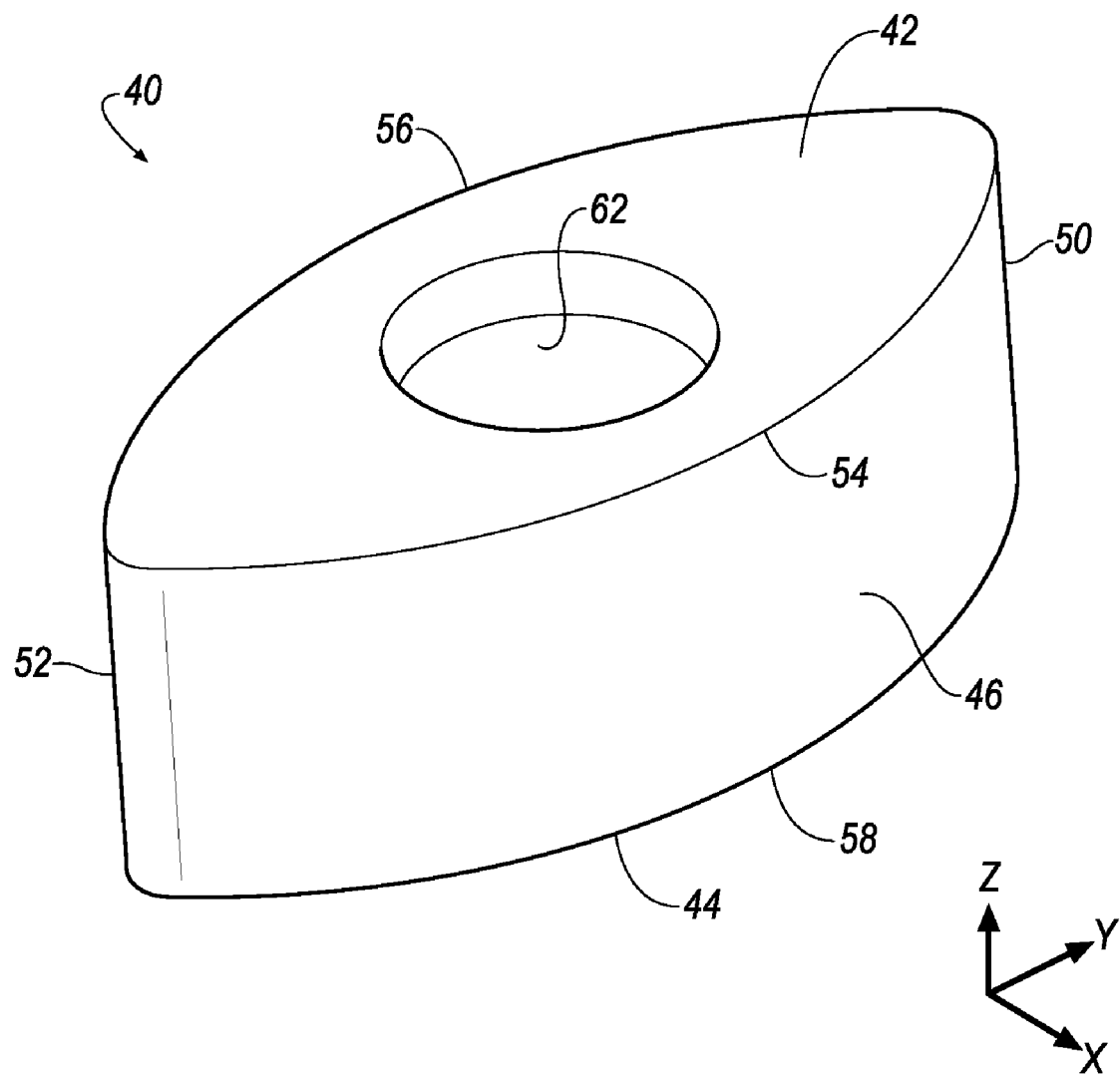
FIG. 5 is a perspective view of a cutting insert for use with the cutting tool of FIG. 1.

As shown in FIG. 5, the cutting insert 40 includes a first substantially planar surface 42, a second, opposite substantially planar surface 44. The plane of the first surface 42 is substantially parallel to the plane formed by the second surface 44. The cutting insert 40 includes a first curvilinear side surface 46 and a second curvilinear side surface 48, and a corner radius 50, 52 between the first and second curvilinear side surfaces 46, 48. The first and second side surfaces 46, 48 are substantially elliptical in shape. The first and second side surfaces 46, 48 are formed at an angle of approximately ninety (90) degrees with respect to the first and second surfaces 42, 44.

A first pair of cutting edges 54, 56 is formed at the intersection between the first surface 42 and the first and second side surfaces 46, 48, and a second pair of cutting edges 58, 60 is formed at the intersection between the second surface 44 and the first and second side surfaces 46, 48. A countersunk bore 62 extends from the first surface 42 to the second surface 44 that enables the cutting insert 40 to be mounted in the insert-receiving pocket 20a such that all four cutting edges 54, 56, 58 and 60 can be used during machining operations.

The cutting insert 40 is mirror symmetric about all three central axes; the x-, y- and z-axis. Specifically, the x- and y-axes are substantially parallel to the first and second surfaces 42, 44, which the z-axis is substantially perpendicular to the first and second surface 42, 44. Because of this symmetry, the cutting insert 40 can be mounted in the insert-receiving pocket 20a such that the first surface 42 becomes the top surface and the second surface 44 becomes the bottom surface and engages the bottom support surface 24 and the first and second side surfaces 46, 48 engage the insert-receiving pocket 20a. When the cutting insert 40 is mounted in this manner, the cutting edges 54, 56 can be used in machining operations by rotating the cutting insert 40 about the z-axis 180°. In addition, the cutting insert 40 can be mounted in the insert-receiving pocket 20a such that the second surface 44 becomes the top surface and the first surface 42 becomes the bottom surface and engages the bottom support surface 24 and the first and second side surfaces 46, 48 engage the contact areas 27, 29 of the insert-receiving pocket 20a. When the cutting insert 40 is mounted in this manner, the cutting edges 58, 60 can be used in machining operations by rotating the cutting insert 40 about the z-axis 180°. Thus, the cutting insert 40 of the invention provides four (4) cutting edges that can be used in machining operations, as compared to only two or less cutting edges that are provided in conventional cutting inserts for ball end mills.

Referring back to FIGS. 1-4, one aspect of the invention is that the cutting tool 10 includes a coolant delivery system, shown generally at 70 (in phantom), that provides cutting fluid in a fan-like pattern to the cutting insert 40. Unlike conventional coolant delivery systems, the coolant delivery system 70 has a geometry that causes the cutting fluid to exit the forward end 14 proximate the cutting insert 40 such that the cutting fluid is distributed substantially evenly over the appropriate cutting edge 54, 56, 58, 60 of the cutting insert 40 during a machining operation.

The coolant delivery system 70 includes an internal main coolant passage 72 having a main coolant inlet 74 extending into the rearward end 16 toward the forward end 14 of the cutting tool 10. The main coolant inlet 74 enables a supply of pressurized cutting fluid (not shown) to be introduced into the body 12 of the cutting tool 10. The coolant delivery system 70 further includes an internal primary coolant passage 76 in fluid communication with the main coolant passage 72. The primary coolant passage 76 extends from the main coolant passage 72 to a primary coolant outlet 78 exiting into the insert-receiving pocket 20a. The coolant delivery system 70 further includes an internal secondary coolant passage 80 in fluid communication with the primary coolant passage 76. The secondary coolant passage 80 extends from the primary coolant passage 76 to a secondary coolant outlet 82 exiting into the insert-receiving pocket 20a. Although it is shown that the primary coolant outlet 78 and the secondary coolant outlet 82 exit into the insert-receiving pocket 20a, it will be understood that the outlets 78, 82 form an outlet 84 that exits into the insert-receiving pocket 20b via additional primary and secondary coolant passages 76, 80, as well as any other insert-receiving pockets that the cutting tool 10 may have.

The geometry of the main coolant passage 72, primary coolant passage 76 and secondary coolant passage 80 can vary depending on several design criteria, such as the geometry of the cutting tool, the geometry of the cutting insert, and the like. In the illustrated embodiment, the main coolant passage 72, the primary coolant passage 76 and the secondary coolant passage 80 are substantially circular in cross-sectional shape. However, the invention is not limited by the cross-sectional shape of the coolant passages 72, 76, 80, and that the invention can be practiced with polygonal shapes, such as rectangular, triangular, diamond, and the like.

In the illustrated embodiment, the main coolant passage 72 has a larger diameter than the primary coolant passage 76 and the secondary coolant passage 80, which have approximately the same diameter. However, it will be appreciated that the invention is not limited by the respective diameters of the passages 72, 76, 80, and that the invention can be practiced with any desirable diameter for each of the passages 72, 76, 80. For example, the invention can be practiced with all three passages 72, 76, 80 having approximately the same diameter.

It will also be appreciated that the invention in not limited by the number of passages, so long as there is at least one main coolant passage, at least one primary coolant passage and at least one secondary coolant passage. Also, the outlets of the each of primary and secondary coolant passages intersect with another passage at or near one or more of the axial and radial support surfaces 26, 28 and the free surface 32. For example, the invention can be practiced with a single main coolant passage 72, a single primary coolant passage 76, and a plurality of secondary coolant passages 80, each of the passages having the same diameter or some of the passages having a different diameter. In this example, each of the outlets from the secondary coolant passages intersects with an outlet from an adjacent secondary coolant passage, and an outlet from one of the secondary coolant passages intersects the primary coolant passage. It will be appreciated that many variations of the number and geometry of the coolant passages is within the scope of the invention.

Figure 4:
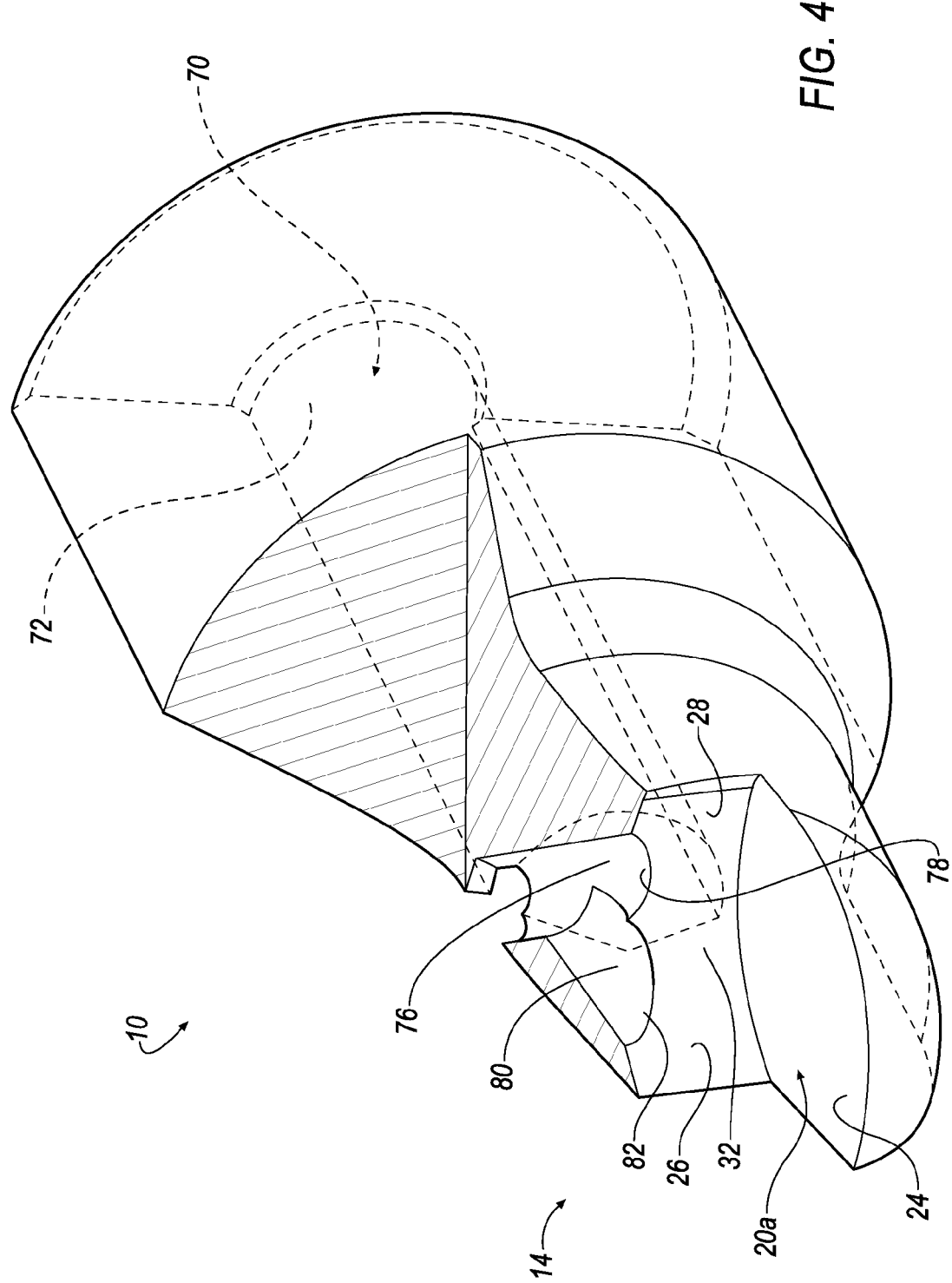
FIG. 4 is a perspective partial cross-sectional view of the coolant delivery system according to an embodiment of the invention.

As shown in FIGS. 1, 3 and 4, the primary coolant outlet 78 and the secondary coolant outlet 82 intersect at one or both of the side support surfaces 26, 28, as well as the free surface 32 of the insert-receiving pocket 20a, so as to form an outlet 84 that is substantially non-circular in shape. As a result of the intersection between the primary coolant outlet 78 and the secondary coolant outlet 82, the outlet 84 includes upper and lower cusps 86, 88 that aid in distributing the cutting fluid between the primary and secondary coolant passages 76, 80. The non-circular shape of the outlet 84 causes the cutting fluid to exit the outlet 84 in a fan-like pattern, thereby distributing the cutting fluid to the entire cutting edge 54, 56, 58, 60 of the cutting insert 40 during a machining operation. As a result, thermal damage to the cutting insert 40 is minimized, as compared to cutting tools with conventional coolant delivery systems.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting tool including a body having a forward end and a rearward end, the forward end including an insert-receiving pocket, the body further including a coolant delivery system comprising a main coolant passage having a main coolant inlet extending from the rearward end toward the forward end, a primary coolant passage in fluid communication with the main coolant passage and having a primary coolant outlet exiting into the insert-receiving pocket, and a secondary coolant passage in fluid communication with the primary coolant passage and having a secondary coolant outlet exiting into the insert-receiving pocket, wherein the main coolant passage has a first diameter, and wherein the primary coolant passage has a second diameter, and wherein the secondary coolant passage has a third diameter.

2. The cutting tool according to claim 1, wherein the first diameter is larger than the second diameter and the third diameter.

3. The cutting tool according to claim 1, wherein the second diameter is larger than the third diameter.

4. A cutting tool including a body having a forward end and a rearward end, the forward end including an insert-receiving pocket, the body further including a coolant delivery system comprising a main coolant passage having a main coolant inlet extending from the rearward end toward the forward end, a primary coolant passage in fluid communication with the main coolant passage and having a primary coolant outlet exiting into the insert-receiving pocket, and a secondary coolant passage in fluid communication with the primary coolant passage and having a secondary coolant outlet exiting into the insert-receiving pocket, wherein the main coolant passage is formed at a first angle with respect to a longitudinal axis of the body, and wherein the primary coolant passage is formed at a second angle with respect to the longitudinal axis of the body, and wherein the secondary coolant passage is formed at a third angle with respect to the longitudinal axis of the body.

5. The cutting tool according to claim 4, wherein the first angle is approximately equal to zero.

6. The cutting tool according to claim 4, wherein the second angle is non-zero, and wherein the third angle is non-zero.

7. The cutting tool according to claim 4, wherein the second angle is approximately equal to the third angle.

8. A cutting tool including a body having a forward end and a rearward end, the forward end including an insert-receiving pocket, the body further including a coolant delivery system comprising a main coolant passage having a main coolant inlet extending from the rearward end toward the forward end, a primary coolant passage in fluid communication with the main coolant passage and having a primary coolant outlet exiting into the insert-receiving pocket, and a secondary coolant passage in fluid communication with the primary coolant passage and having a secondary coolant outlet exiting into the insert-receiving pocket, wherein the primary coolant outlet intersects the secondary coolant outlet to form an outlet having a substantially non-circular shape.

9. The cutting tool according to claim 8, wherein the cutting tool comprises a ball end mill.

10. A cutting tool including a body having a forward end and a rearward end, the forward end including an insert-receiving pocket, the body further including a coolant delivery system comprising a main coolant passage having a main coolant inlet extending from the rearward end toward the forward end, a primary coolant passage in fluid communication with the main coolant passage and having a primary coolant outlet exiting into the insert-receiving pocket, and a secondary coolant passage in fluid communication with the primary coolant passage and having a secondary coolant outlet exiting into the insert-receiving pocket, and further comprising a cutting insert mounted within the insert-receiving pocket, the cutting insert including a first substantially planar surface, a second substantially planar surface, a first curvilinear side surface, a second curvilinear side surface, a first pair of cutting edges formed at an intersection between the first substantially planar surface and the first and second curvilinear side surfaces, and a second pair of cutting edges formed at an intersection between the second substantially planar surface and the first and second curvilinear side surfaces.

11. The cutting tool according to claim 10, wherein the first substantially planar surface is substantially parallel to the second substantially planar surface.

12. A cutting insert according to claim 10, wherein the cutting insert is mirror symmetric about all three central x-, y- and z-axis.

13. A cutting insert according to claim 10, further comprising a corner radius between the first and second curvilinear side surfaces.

14. The cutting tool according to claim 10, wherein the insert-receiving pocket includes a bottom support surface, an axial support surface, a radial support surface, and a free surface between the axial support surface and the radial support surface.

15. The cutting tool according to claim 1, wherein the cutting tool comprises a ball end mill.

16. The cutting tool according to claim 4, wherein the cutting tool comprises a ball end mill.

17. The cutting tool according to claim 10, wherein the cutting tool comprises a ball end mill.

* * * * *